United States Patent
Busser et al.

(10) Patent No.: US 9,814,180 B2
(45) Date of Patent: Nov. 14, 2017

(54) SHELL CORN LOSS INHIBITING DEVICE

(71) Applicants: Monte Busser, Colton, SD (US); Curt Theisen, Dell Rapids, SD (US)

(72) Inventors: Monte Busser, Colton, SD (US); Curt Theisen, Dell Rapids, SD (US)

( * ) Notice: Subject to any disclaimer, the term of this patent is extended or adjusted under 35 U.S.C. 154(b) by 33 days.

(21) Appl. No.: 15/060,751

(22) Filed: Mar. 4, 2016

(65) Prior Publication Data

US 2017/0251602 A1    Sep. 7, 2017

(51) Int. Cl.
| | |
|---|---|
| *A01D 45/02* | (2006.01) |
| *A01D 41/06* | (2006.01) |
| *A01D 63/04* | (2006.01) |
| *A01D 61/00* | (2006.01) |

(52) U.S. Cl.
CPC .......... *A01D 45/021* (2013.01); *A01D 41/06* (2013.01); *A01D 61/002* (2013.01); *A01D 63/04* (2013.01)

(58) Field of Classification Search
CPC ...... A01D 57/10; A01D 45/30; A01D 45/021; A01D 41/1252; Y10S 56/08
See application file for complete search history.

(56) References Cited

U.S. PATENT DOCUMENTS

| | | | | |
|---|---|---|---|---|
| 859,602 A | * | 7/1907 | Green | A01D 34/30 30/133 |
| 1,794,658 A | * | 3/1931 | Walsh | A01D 57/10 56/1 |
| 2,670,586 A | * | 3/1954 | Phillips | A01D 57/10 56/1 |
| 2,710,516 A | * | 6/1955 | Kaesemeyer, Jr. | A01D 57/10 56/1 |
| 2,718,744 A | * | 9/1955 | Phillips | A01D 57/10 56/1 |
| 2,737,006 A | * | 3/1956 | Klingler | A01D 57/10 37/447 |
| 2,780,046 A | * | 2/1957 | Edwards | A01D 57/10 56/1 |
| 2,797,543 A | * | 7/1957 | Rasmussen | A01D 45/021 56/1 |
| 3,599,402 A | | 8/1971 | Heising | |
| 3,640,055 A | | 2/1972 | Looker | |
| 3,961,465 A | | 6/1976 | Winings | |
| 4,168,798 A | * | 9/1979 | Moore | A01M 7/0064 239/121 |
| 4,303,373 A | * | 12/1981 | Polhemus | A01D 45/30 415/206 |
| 4,406,112 A | * | 9/1983 | Brooks | A01D 57/10 56/12.9 |

(Continued)

FOREIGN PATENT DOCUMENTS

| | | |
|---|---|---|
| GB | 313182 | 6/1929 |
| GB | 1157337 | 7/1969 |

*Primary Examiner* — Arpad Fabian-Kovacs

(57) ABSTRACT

A shell corn loss inhibiting device includes a corn head of a combine including a pair of spaced dividers, a gap therebetween, and a collection auger. Each of a pair of nozzles is coupled to an associated one of the spaced dividers and angled inwardly towards the gap, downwardly through the gap, and rearwardly towards the collection auger. A blower is coupled to the combine urging a flow of air out through each of the nozzles to urge the shell corn towards the collection auger before the shell corn can pass downwardly through the gap.

6 Claims, 2 Drawing Sheets

(56) References Cited

U.S. PATENT DOCUMENTS

| | | | | |
|---|---|---|---|---|
| 4,730,444 | A | * | 3/1988 | Leffel .................... A01D 45/30 56/12.9 |
| 4,783,951 | A | * | 11/1988 | Richards ................ A01D 57/10 56/12.9 |
| 4,825,628 | A | * | 5/1989 | Brooks .................. A01D 57/08 56/14.5 |
| 4,866,919 | A | * | 9/1989 | Brooks .................. A01D 57/10 56/12.9 |
| 4,884,392 | A | * | 12/1989 | Czajkowski ......... A01D 51/002 56/12.9 |
| 5,134,837 | A | * | 8/1992 | Casey .................... A01D 45/30 56/12.8 |
| 5,282,352 | A | | 2/1994 | Schoolman |
| 5,322,472 | A | * | 6/1994 | Little ................ A01D 41/1252 460/100 |
| 5,453,051 | A | | 9/1995 | Schlough |
| 6,475,082 | B2 | | 11/2002 | Visagie |
| 7,373,767 | B2 | | 5/2008 | Calmer |
| 7,524,242 | B2 | | 4/2009 | Stukenhotltz et al. |
| 7,591,127 | B1 | * | 9/2009 | Stacer .................... A01D 65/00 56/12.9 |
| 7,870,713 | B2 | * | 1/2011 | Schroeder ............. A01D 57/10 56/12.8 |
| 8,113,353 | B2 | | 2/2012 | Redekop |
| 8,371,914 | B2 | | 2/2013 | Cressoni |
| 9,462,750 | B2 | * | 10/2016 | Cavkusic ............... A01D 57/01 |

\* cited by examiner

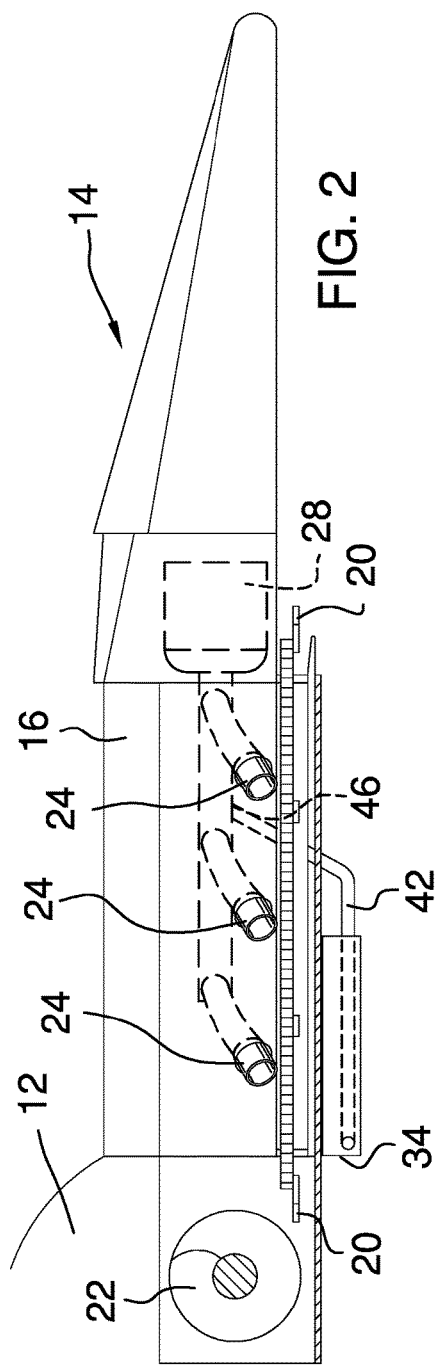
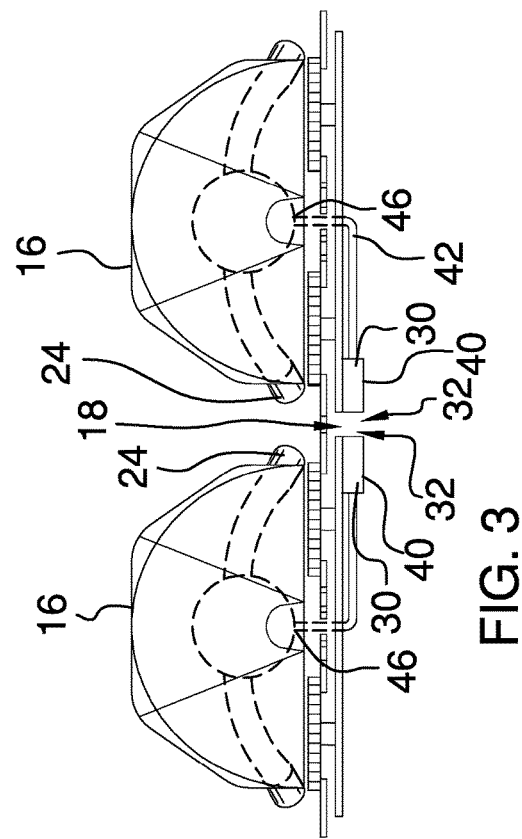

SHELL CORN LOSS INHIBITING DEVICE

BACKGROUND OF THE DISCLOSURE

Field of the Disclosure

The disclosure relates to crop loss inhibiting devices and more particularly pertains to a new crop loss inhibiting device for enhancing shell corn collection efficiency by catching and re-circulating fallen corn back towards a collecting auger of a combine.

SUMMARY OF THE DISCLOSURE

An embodiment of the disclosure meets the needs presented above by generally comprising a corn head of a combine including a pair of spaced dividers, a gap therebetween, and a collection auger. Each of a pair of nozzles is coupled to an associated one of the spaced dividers and angled inwardly towards the gap, downwardly through the gap, and rearwardly towards the collection auger. A blower is coupled to the combine urging a flow of air out through each of the nozzles to urge the shell corn towards the collection auger before the shell corn can pass downwardly through the gap.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a partial cut away side view of an embodiment of the disclosure.

FIG. 3 is a front view of an embodiment of the disclosure.

DESCRIPTION OF THE PREFERRED EMBODIMENT

Figure 1:
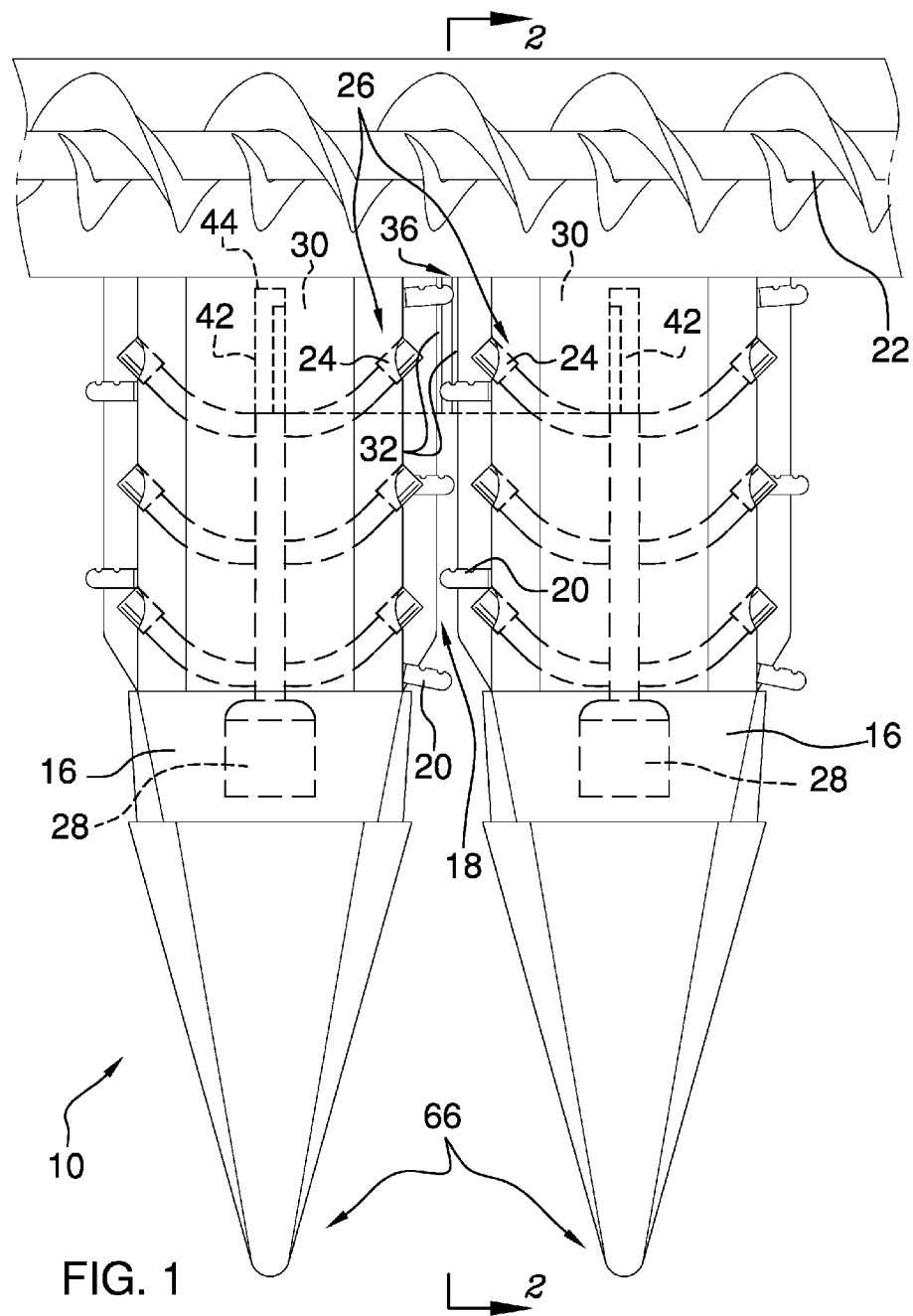
FIG. 1 is a top view of a shell corn loss inhibiting device according to an embodiment of the disclosure.

With reference now to the drawings, and in particular to FIGS. 1 through 3 thereof, a new crop loss inhibiting device embodying the principles and concepts of an embodiment of the disclosure and generally designated by the reference numeral 10 will be described.

As best illustrated in FIGS. 1 through 3, the shell corn loss inhibiting device 10 generally comprises a combine 12 having a corn head 14. The corn head 14 includes at least a pair of spaced dividers 16 defining a gap 18 therebetween. The gap 18 is configured for receiving corn stalks which are moved through the gap 18 facilitated by gathering hooks 20 or chains in a conventional manner. The combine 12 has a collection auger 22 positioned rearwardly from the spaced dividers 16 wherein the collection auger 22 receives and collects shell corn from the corn stalks after the corn stalks pass through the gap 18.

Each of a plurality of nozzles 24 is coupled to an associated one of the spaced dividers 16. Each of the nozzles 24 is angled relative to the associated one of the spaced dividers 16 such that each nozzle 24 is directed inwardly towards the gap 18, downwardly through the gap 18, and rearwardly towards the collection auger 20. The nozzles 24 may be fixed to the associated spaced divider 16 or may be adjustable in a conventional manner. The nozzles 24 are linearly aligned along each of the spaced dividers 16 extending generally along a length of the gap 18. The nozzles 24 are further arranged in laterally aligned pairs 26 across the gap 18.

Each of a plurality of blowers 28 is coupled to the combine 12. Each blower 28 is attached to an associated one of the spaced dividers 16. Each of the blowers 28 may be positioned towards a front 66 of the associated one of the spaced dividers 16. Each blower 28 urges a flow of air out through the nozzles 24 positioned on the associated one of the spaced dividers 16. Alternatively, a single blower 28 may be provided and a manifold utilized to deliver air flow to each of the nozzles 24 regardless to which divider 16 the nozzle 24 is attached.

The nozzles 24 provide air flow rearwardly towards the collection auger 22 to urge shell corn into the collection auger before it may pass downwardly through the gap 18. Further efficiency in collecting shell corn is provided using a pair of collection pans 30. Each collection pan 30 is coupled to an associated one of the spaced dividers 16. Each collection pan 30 has a lateral edge 32 positioned adjacent to the gap 18 and defining an opening into the collection pan 30. Each of the collection pans 30 further has a back edge 34 positioned adjacent to a terminal end 36 of the gap 18 adjacent to the collection auger 22. Thus, the collection pans 30 are positioned towards a rear end of the dividers 16 to receive shell corn passing downwardly through the gap 18. The nozzles 24 facilitate direction of the falling shell corn laterally into the collection pans 30. A respective bottom 40 of each collection pan 30 has an angled section extending downwardly and inwardly into the collection pan 30 from the lateral edge 32 positioned adjacent to the gap 18. Each of a pair of re-circulation hoses 42 has a first end 44 in communication with an associated one of the collection pans 30. Each of the re-circulation hoses 42 has a second end 46 in environmental communication with an associated one of the nozzles 24 and the blower 28 such that the blower 28 provides suction from the first end 44 to the second end 46 whereby shell corn collected in the collection pans 30 is re-circulated back and outwardly through the nozzles 24 and towards the collection auger 22.

In use, the blower 28 or blowers are activated while using the combine 12 in a conventional manner. The air flow through the nozzles 24 directs loose grains to the collection auger 22 while the collection pans 30 receive and re-circulate shell corn falling through the gap 18 between dividers 16 back through the nozzles 24 until eventually collected by the collection auger 22. Thus, loss of shell corn falling to the ground through the gap 18 is drastically reduced.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A shell corn loss inhibiting device comprising:
a combine having a corn head, said corn head including a pair of spaced dividers defining a gap therebetween configured for receiving corn stalks, said combine having a collection auger positioned rearwardly from said spaced dividers wherein said collection auger receives and collects shell corn from the corn stalks passing through said gap;
a pair of nozzles, each of said nozzles being coupled to an associated one of said spaced dividers, each of said nozzles being angled relative to said associated one of said spaced dividers such that each said nozzle is directed inwardly towards said gap, downwardly through said gap, and rearwardly towards said collection auger;
a blower coupled to said combine, said blower urging a flow of air out through each of said nozzles wherein said blower is configured to urge the shell corn towards said collection auger before the shell corn can pass downwardly through said gap;
a pair of collection pans, each collection pan being coupled to an associated one of said spaced dividers, each said collection pan having a lateral edge positioned adjacent to said gap, each of said collection pans having a back edge positioned adjacent to a terminal end of said gap adjacent to said collection auger wherein said collection pans are positioned to receive shell corn passing downwardly through said gap; and
a pair of re-circulation hoses, each of said re-circulation hoses having a first end in communication with an associated one of said collection pans, each of said re-circulation hoses having a second end in environmental communication with an associated one of said nozzles such that said blower provides suction from said first end to said second end whereby shell corn collected in said collection pans is re-circulated back through said nozzles and towards said collection auger.

2. The device of claim 1, further comprising a respective bottom of each said collection pan having an angled section extending downwardly and inwardly into said pan from said lateral edge positioned adjacent to said gap.

3. The device of claim 1, further comprising said blower being one of a pair of blowers, each said blower being attached to an associated one of said spaced dividers.

4. The device of claim 3, further comprising each of said blowers being positioned towards a front of said associated one of said spaced dividers.

5. The device of claim 1, further comprising said pair of nozzles being one of a plurality of pairs of nozzles, said pairs of nozzles being linearly arranged along said spaced dividers.

6. A shell corn loss inhibiting device comprising:
a combine having a corn head, said corn head including a pair of spaced dividers defining a gap therebetween configured for receiving corn stalks, said combine having a collection auger positioned rearwardly from said spaced dividers wherein said collection auger receives and collects shell corn from the corn stalks passing through said gap;
a plurality of nozzles, each of said nozzles being coupled to an associated one of said spaced dividers, each of said nozzles being angled relative to said associated one of said spaced dividers such that each said nozzle is directed inwardly towards said gap, downwardly through said gap, and rearwardly towards said collection auger, said nozzles being linearly aligned along each of said spaced dividers, said nozzles being arranged in laterally aligned pairs across said gap;
a plurality of blowers coupled to said combine, each said blower being attached to an associated one of said spaced dividers, each of said blowers being positioned towards a front of said associated one of said spaced dividers, each said blower urging a flow of air out through said nozzles positioned on said associated one of said spaced dividers;
a pair of collection pans, each collection pan being coupled to an associated one of said spaced dividers, each said collection pan having a lateral edge positioned adjacent to said gap, each of said collection pans having a back edge positioned adjacent to a terminal end of said gap adjacent to said collection auger wherein said collection pans are positioned to receive shell corn passing downwardly through said gap, a respective bottom of each said collection pan having an angled section extending downwardly and inwardly into said pan from said lateral edge positioned adjacent to said gap; and
a pair of re-circulation hoses, each of said re-circulation hoses having a first end in communication with an associated one of said collection pans, each of said re-circulation hoses having a second end in environmental communication with an associated one of said nozzles such that said blower provides suction from said first end to said second end whereby shell corn collected in said collection pans is re-circulated back through said nozzles and towards said collection auger.

\* \* \* \* \*